United States Patent [19]

Selmeczi

[11] 3,919,394

[45] Nov. 11, 1975

[54] PROCESS FOR THE REMOVAL OF OXIDES OF SULFUR FROM A GASEOUS STREAM

[75] Inventor: Joseph G. Selmeczi, Pittsburgh, Pa.

[73] Assignee: Dravo Corporation, Pittsburgh, Pa.

[22] Filed: May 14, 1973

[21] Appl. No.: 359,777

[52] U.S. Cl. .............................. 423/242; 423/244
[51] Int. Cl.² .................................... C01B 17/00
[58] Field of Search ............ 423/242, 244, 554, 555

[56] References Cited
UNITED STATES PATENTS

| | | | |
|---|---|---|---|
| 1,077,243 | 10/1913 | DeCew | 423/244 |
| 2,090,143 | 8/1937 | Nonhebel et al. | 423/242 |
| 3,632,305 | 1/1972 | Hardison | 423/242 |
| 3,632,306 | 1/1972 | Villiers-Fisher et al. | 423/242 |
| 3,758,668 | 9/1973 | Lapple et al. | 423/242 |

FOREIGN PATENTS OR APPLICATIONS

| | | | |
|---|---|---|---|
| 708,095 | 1954 | United Kingdom | 423/242 |

OTHER PUBLICATIONS

*Condensed Chemical Dictionary*, Edited by Rose, Reinhold Publ., 1962, pp. 417 and 668.

Primary Examiner—Herbert T. Carter
Assistant Examiner—Eugene T. Wheelock
Attorney, Agent, or Firm—Parmelee, Miller, Welsh & Kratz

[57] ABSTRACT

The removal of oxides of sulfur from gaseous streams is increased by the addition of magnesium oxide or magnesium hydroxide to a calcium hydroxide scrubbing liquor in an amount sufficient to provide magnesium ions in the liquor, upon introduction to a scrubbing unit, of between 250 and 5000 parts per million. The controlled amount of magnesium ions results in a higher alkalinity of the scrubber liquor and, in addition to increasing the sulfur removal from the gaseous stream, reduces the formation of calcium salt scaling within the system. The pH of the liquor, prior to introduction into the scrubber, is adjusted to a pH of between 5.5 and 10.0, preferably by the addition of predetermined amounts of calcium hydroxide and magnesium hydroxide thereto.

11 Claims, 2 Drawing Figures

PROCESS FOR THE REMOVAL OF OXIDES OF SULFUR FROM A GASEOUS STREAM

BACKGROUND OF THE INVENTION

There are many processes suggested for use in the removal of oxides of sulfur, such as sulfur dioxide, from gaseous streams. In the combustion of sulfur-containing coals, regulations have been imposed which require that the gases discharged to the atmosphere after such combustion contain only a low sulfur dioxide content, which requires either removal of sulfur from the coal prior to combustion or removal of sulfur dioxide from the flue gas stream following combustion.

A preferred process for the removal of sulfur dioxide from the flue gas resulting from combustion of sulfur-containing coal uses a liquid slurry or solution of lime, calcium oxide, or limestone, basically, calcium carbonate. These calcium components react with the sulfur dioxide and form calcium salts such as sulfites and sulfates. While limestone is more economical than lime as a starting reactant, it must normally be ground to a very fine particle size and some such stones react only at a low rate with sulfur dioxide requiring excessive amounts of reactant and a high through put for the scrubbing unit wherein the sulfur dioxide is contacted with the reactant. The use of lime, wherein burnt lime is hydrated and charged to a scrubbing unit, thus has an advantage as to reactivity. Lime addition, however, produces sulfites, carbonates and sulfates in a reacted scrubbing liquor and, since the sulfate tends to only slowly form in the liquor, supersaturated liquors result from which the calcium sulfate precipitates as scale in the scrubbing unit because of the need to recycle such liquors to provide an economical process.

I have discovered that by the addition of a controlled amount of magnesium to a lime scrubbing liquor, the removal of sulfur dioxide from a gaseous stream is enhanced and the problem of scaling within the system alleviated, with a resultant efficient and economical process provided.

BRIEF SUMMARY OF THE INVENTION

A gaseous stream containing oxides of sulfur is contacted, within a scrubbing unit, with an aqueous liquor to which lime and a specific amount of magnesium oxide is added, the magnesium ion present in an amount of 250–5000 parts per million. The magnesium present increases the alkalinity of the scrubbing liquor and removal of the oxides of sulfur while reducing scaling normally found in lime scrubbing systems. The pH of the liquor, prior to introduction into the scrubbing unit, is adjusted to between 5.5 and 10.0, preferably between 6.0–8.0, to control the solubility of various salts and hydroxides present. The magnesium content of the liquor is controlled by adding either magnesium oxide or hydroxide to the effluent from the scrubber prior to recycling of the effluent to the scrubbing unit. The effluent is generally in a recycle tank and then passes to a clarifying tank where solids are precipitated from the effluent. A portion of the clarified effluent from the clarifier is returned to the scrubbing unit, while a portion thereof may also be used to hydrate lime and magnesium oxide for introduction to the recycle tank and re-use.

DETAILED DESCRIPTION

Figure 1:
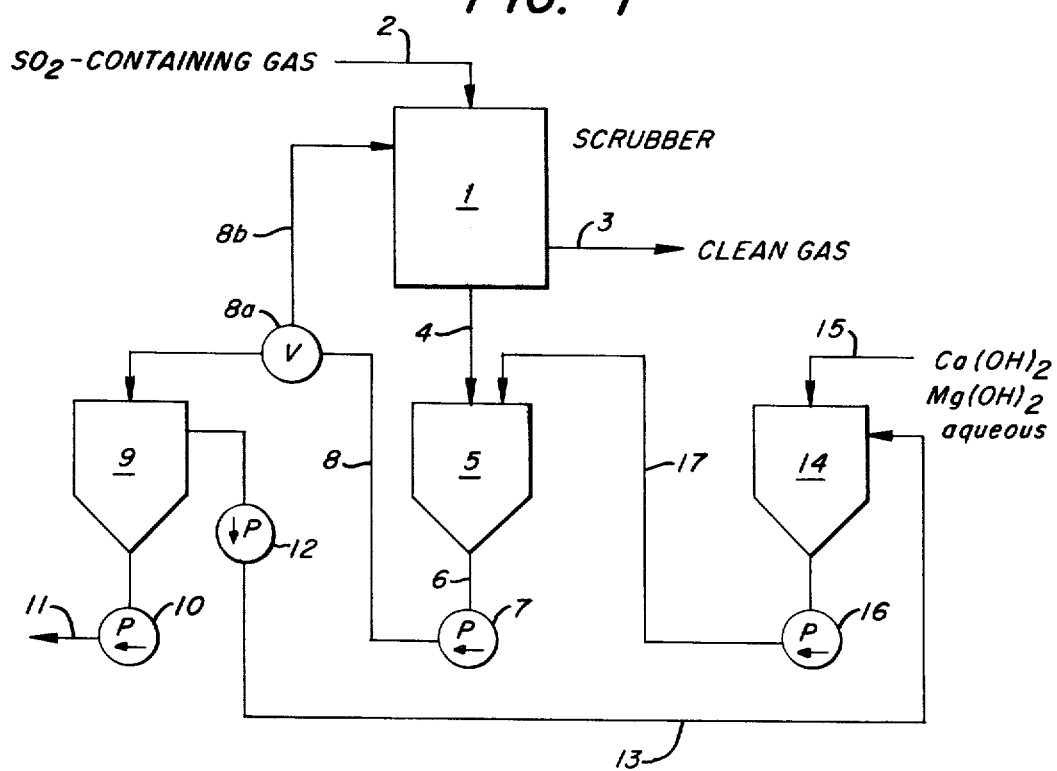
FIG. 1 is a schematic illustration of the preferred embodiment of the present invention.

Referring now to FIG. 1, there is illustrated a flow diagram of the preferred embodiment of the process. Gases containing oxides of sulfur, such as sulfur dioxide and sulfur trioxide, are illustrated as gas stream 2 which is directed into a scrubber 1. The gas stream can comprise the flue gas from a coal burning boiler, in which case the gas stream would carry with it fly ash, carbon dioxide, and other impurities, or it can comprise off-gases from smelters or chemical processing units which give off gases containing oxides of sulfur. The gas is introduced into the scrubbing unit 1, which may be of conventional design, such as a venturi-type scrubber, where the gas stream is contacted with an aqueous solution to absorb oxides of sulfur from the gas stream, and the gas stream discharged from the scrubber 1 as clean gas stream 3, which is then released to the atmosphere. In the scrubber 1, the gas stream is contacted with a scrubbing liquor which is an aqueous solution or slurry of lime, which lime as $Ca(OH)_2$ reacts with the oxides of sulfur to produce mainly calcium sulfites and calcium sulfates. The scrubbing liquor discharged from the scrubber through conduit 4 is fed to a tank 5, a recycle tank, then through conduit 6 to a pump 7, which directs the liquor by means of conduit 8 to valve 8a and conduit 8b back to the scrubber 1. A portion of the liquor is directed through valve 8a to a clarifier or settling tank 9. The settling tank 9 may be a clarifying unit such as a thickener, centrifuge or other such solid-liquid separator. In the clarifier 9, the liquor is held and solids which precipitate from the liquor, such as sulfites, carbonates, and sulfates, form a lower thickened portion of liquor in the clarifier which is directed by pump 10 and conduit 11 for disposal or other use. The clear liquor from the upper portion of clarifier 9 is directed by pump 12 through conduit 13 to a lime slurry tank 14, to which a concentrated slurry of lime is added, as indicated by stream 15. The aqueous slurry of lime is then fed by pump 16 through line 17 to recycle tank 5 to provide fresh calcium hydroxide for use in the removal of oxides of sulfur from the gaseous stream in the scrubber. Recycle tank 5 contains solids removed from the gas stream such as fly ash and products of reaction between the gases and the lime slurry, such as calcium sulfites, sulfates, and carbonates.

The process heretofore described is a known process but suffers from lower efficiency than commercially desired because of the low solubility of calcium sulfite and carbonate, and also because of scaling.

The present process provides for a controlled amount of magnesium ion to be present within the scrubbing liquor so as to increase the alkalinity of the liquor. The liquor contains magnesium sulfite, magnesium carbonate and magnesium bicarbonate which effects scrubbing of the sulfur dioxide with only a small amount of calcium ions present in the liquor. The magnesium ions are preferably provided by adding to the calcium hydroxide fed to the lime slurry tank 14, an aqueous slurry of magnesium oxide or magnesium hydroxide, which mixed solution is charged to recycle tank 5 by pump 16 and line 17. The magnesium hydroxide reacts with the acids and acid salts in the recycle tank 5 according to the following reactions:

$Mg(HSO_3)_2 + Mg(OH)_2 \rightarrow 2MgSO_3$ $Mg(HCO_3)_2 + Mg(OH)_2 \rightarrow 2MgCO_3$ The pH of the scrubbing liquor should also be regulated, with a pH between 5.5 and 10.0 being desired. The feed liquor to the scrubber, if having a pH of less than 5.5, does not contain enough alkalinity to effect scrubbing. If a liquor with too high a pH is recirculated to the scrubber, it will contain bicarbonates and, with lime added in the recycle tank, it will be converted to carbonates with attendant precipitation and loss of calcium hydroxide. Above a pH of about 10.0, the magnesium hydroxide will not be dissolved in the scrubber, resulting in its loss.

The lime added to the recycle tank reacts with the magnesium bisulfite to form precipitated calcium sulfite and soluble magnesium sulfite according to the reaction;

$Mg(HSO_3)_2 + Ca(OH)_2 + aq. \rightarrow CaSO_3 \cdot \frac{1}{2}H_2O + MgSO_3 + 2H_2O$ The scrubbing liquor in the scrubber 1 absorbs sulfur dioxide, $SO_2$, by its reaction with sulfite, carbonate, and bicarbonate ions present in the liquor, generally according to the following reactions:

$SO_2 + H_2O \rightarrow H_2SO_3$ $H_2SO_3 + MgSO_3 \rightarrow Mg(HSO_3)_2$ $2H_2SO_3 + MgCO_3 \rightarrow Mg(HSO_3)_2 + H_2O + CO_2$ $2H_2SO_3 + Mg(HCO_3)_2 \rightarrow Mg(HSO_3)_2 + H_2O + 2CO_2$ As shown by the above, the magnesium carbonate, bicarbonate and sulfite ions present in the scrubbing liquor react with and remove sulfur dioxide from the gaseous stream with resultant formation of magnesium bisulfite.

The amount of magnesium ions present in the scrubbing liquor will effect the amount of bicarbonate, carbonate, sulfite and hydroxide ions present, which negative ions represent the degree of alkalinity of the solution. Alkalinity, as generally defined, relates to the capacity of an aqueous solution to accept protons, i.e., its capacity to neutralize acids. As used herein, the term alkalinity refers to the capacity to neutralize acid and, specifically, the amount of bicarbonate, carbonate, sulfite and hydroxide ions present in the aqueous scrubbing solution.

In processes where lime alone is used for scrubbing, reaction with oxides of sulfur results in the precipitation of calcium sulfite, calcium carbonate and calcium sulfate. The calcium sulfate is more soluble than the sulfite or carbonate, and since the calcium sulfate tends to slowly precipitate from a supersaturated solution, a difficulty with scaling is encountered. In addition, the amount of bicarbonate, carbonate, and sulfite ions present in the liquor, where lime alone is used, are decreased because of their low solubility in the presence of a high calcium ion concentration, which decreased solubility lowers the alkalinity of the scrubbing liquid. Thus, with use of lime alone, only a relatively low alkalinity can be achieved in the scrubbing liquid. Although the alkalinity may be increased in such systems by increasing the pH of the liquor, such as by feeding free lime to the scrubber and obtaining a pH above 11.0, flue gases containing $CO_2$, almost always in large excess of $SO_2$, cause the added lime to be converted to calcium carbonate before an opportunity is had to remove $SO_2$, wasting such lime. Also, such a high pH with lime addition increases greatly the tendency for scale formation in the scrubbing systems by calcium carbonate scale formation.

In the present process, I have found that by controlling the magnesium content of the scrubbing liquid fed to the scrubber, by addition of a predetermined amount of magnesium hydroxide along with calcium hydroxide, such as by adding the same to the recycle tank, the liquor will contain only a small amount of calcium ions and correspondingly will contain primarily magnesium bisulfite, sulfite, bicarbonate and carbonate. Since these magnesium salts have a higher solubility than their calcium equivalents, the scrubbing liquor will have a higher alkalinity and $SO_2$ absorption potential than conventional lime scrubbing solutions. Sulfate will also be present in the system but, because of the low calcium ion concentration in the liquor, the formation of scale is significantly decreased.

In scrubbing of gases containing oxides of sulfur, the amount of lime generally added is based upon a stoichiometric relationship between the sulfur dioxide present in the gas and the calcium hydroxide added, with one mole of calcium oxide provided for each mole of sulfur dioxide present. Normally, with the above stoichiometric relationship designated as 100% stoichiometric, an excess of lime is added with a stoichiometry of about 110 to as high as 140% being conventional.

The amount of magnesium hydroxide or oxide added to the scrubbing liquor in the present process, replacing a portion of calcium hydroxide normally added, should be in an amount such as to provide a magnesium ion concentration in the liquor of between 250 to 5000 parts per million (ppm). Preferably, the magnesium ion concentration is between 1000 and 1500 ppm. The use of less than 250 ppm of magnesium ion is insufficient to increase the alkalinity of the solution so as to provide the scrubbing effect of the corresponding sulfite, carbonate and bicarbonate ions. Use of magnesium ions in the liquor in excess of about 5000 ppm will result in the saturation of the liquor with magnesium salts and precipitation and loss of magnesium, which must then be replenished, with the sludge or thickened slurry in the clarifier.

In the scrubber 1, the formation of magnesium bisulfite will be effected under the above conditions. The magnesium bisulfite, thus formed, passes with the aqueous liquor to the recycle tank 5 where calcium hydroxide and magnesium hydroxide in predetermined amounts are added. The calcium hydroxide and magnesium hydroxide react with the magnesium bisulfite according to the reactions:

$Mg(HSO_3)_2 + Ca(OH)_2 + aq. \rightarrow CaSO_3 \cdot \frac{1}{2}H_2O + MgSO_3 + 2H_2O$ $Mg(HSO_3)_2 + Mg(OH)_2 \rightarrow 2MgSO_3 + 2H_2O$ In the presence of carbon dioxide in the gas stream and magnesium bicarbonate formed therefrom, the magnesium bicarbonate present in the liquor will, in the recycle tank, react with the added calcium hydroxides as follows:

$Mg(HCO_3) + Ca(OH)_2 \rightarrow CaCO_3 + MgCO_3 + H_2O$ unless, as hereinbefore-described, the pH of the liquor is controlled. Such carbonate formation results in precipitation of calcium salts and wasting of the calcium added thereto.

After leaving the recycle tank 5, a portion of the liquor is passed to clarifier 9, and a portion thereof used as water feed to the lime slurry tank 14. Generally, the slurry discharged from clarifier 9 is a slurry of salts in about 50–70% water which would carry magnesium salts therewith. If it is desired to reduce the dissolved salt content of the thickened clarifier underflow for environmental or other considerations, lime or calcium hydroxide can be added at line 11 and will effect precipitation of calcium and magnesium salts such as follows:

$MgSO_3 + Ca(OH)_2 \rightarrow Mg(OH)_2 + CaSO_3 \cdot \frac{1}{2} H_2O$
$MgSO_4 + Ca(OH)_2 \rightarrow Mg(OH)_2 + CaSO_4 \cdot 2H_2O$
$MgCO_3 + Ca(OH)_2 \rightarrow Mg(OH)_2 + CaCO_3$
$Mg(HCO_3)_2 + 2Ca(OH)_2 \rightarrow Mg(OH)_2 + 2CaCO_3$ The slurry leaving the clarifier 9 through line 11 will carry some magnesium salts with it, which magnesium is replenished in the system by adding magnesium in oxide or hydroxide form to lime slurry tank 14 in an amount corresponding to the loss through line 11.

Figure 2:
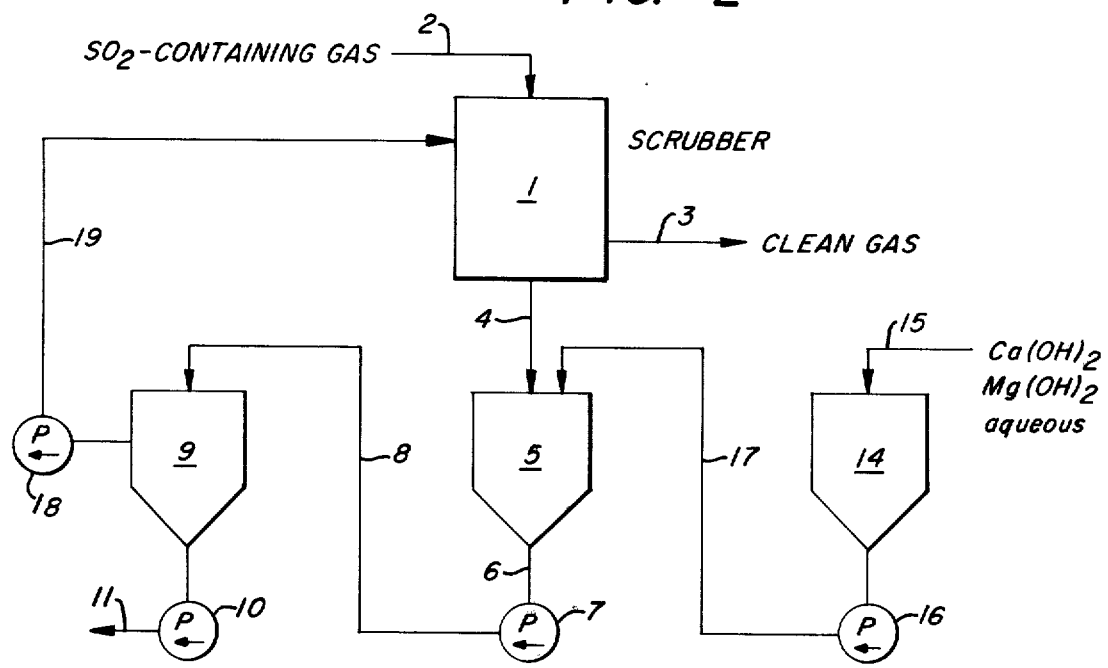
FIG. 2 is a schematic illustration of another embodiment of the present invention.

Another embodiment of the invention is illustrated schematically in FIG. 2. As illustrated therein, the gaseous stream is passed through scrubber 1 where oxides of sulfur are removed, with liquor from the scrubber passing through line 4 to recycle tank 5, in which, as described hereinbefore, the liquor is regenerated by the addition of calcium hydroxide and magnesium hydroxide. The liquor is then carried by line 6 to pump 7 and through line 8 to the clarifier 9, where the solids precipitate out and are discharged by pump 10 through line 11. The clarifier liquor is pumped by pump 18 through conduit 19 back to scrubber 1 for cleaning of the gaseous stream. Lime and magnesium oxide are added to lime slurry tank 14 through stream 15, which slurry thus formed is passed by pump 16 and conduit 17 to the recycle tank 5.

In my process, the magnesium ions required can be obtained economically by the addition to the system of burnt lime which contains calcium and magnesium in the desired proportion, or by the mixing of limestone of predetermined calcium and magnesium content and burning or calcining the same to produce a mixture of calcium and magnesium oxides in the necessary proportion. Blending of high calcium content limes with dolomitic lime can also be carried out to achieve the required calcium-magnesium relationship. The terms magnesium oxide and calcium oxide, as used herein, are meant to include not only the oxides themselves but also in hydrated form.

To provide the desired relationship between calcium and magnesium in the process, the lime added to the system should contain about 1.5 – 7% magnesium oxide, preferably about 3%. While some natural and commercial limestones may contain such a percentage of magnesium oxide, the burning or calcining of such stone destroys the necessary relationship since magnesium oxide tends to combine preferentially with impurities in such stone, such as silica, alumina and iron oxide, and will not be readily dissolved.

The process is further described in the following examples.

EXAMPLE I

A two stage venturi scrubber (Stage I and Stage II) was operated to remove oxides of sulfur from a gaseous stream comprising flue gas from a power plant burning coal containing 3.5–4% sulfur. The scrubber was operated at a liquid to gas ratio of 40 (40 L/G). The liquid over gas ratio indicates the gallon of liquid used to scrub 1,000 cubic feet of gas.

A lime for addition to the scrubber system was prepared by hard burning (ca. 2400°F.) a high calcium limestone, the resultant lime having the following analysis:

```
           CaO - 96.1%
           MgO - 0.6%
 Loss on Ignition - 1.2%
           SiO_2 - 1.4%
          R_2O_3 - 0.9%
Availability as CaO - 92.2%
``` wherein $R_2O_3$ (as used herein and the following examples) represents minor quantities of metal oxides other than those listed.

The scrubber was operated and the sulfur dioxide removal from the gaseous stream was recorded. The stoichiometry used was based on the $SO_2$ at the inlet to the scrubber. The results are as listed in Table I.

Table I

| $SO_2$ (ppm) in Gaseous Stream | % $SO_2$ Removed | Stoichiometry Used [CaO to $SO_2$] |
|---|---|---|
| Inlet | | |
| 2687 | 67 | 1.06 |
| 2871 | 73 | 1.02 |
| 2817 | 74 | 1.13 |

EXAMPLE II

A second experiment was carried out using the same scrubber and operating conditions, except that a soft burned (ca. 1850°F.) high calcium lime was used, which lime had the following analysis:

```
           CaO - 95.2%
           MgO - 0.6%
 Loss on Ignition - 4.2%
           SiO_2 - 0.6%
          R_2O_3 - 0.3%
Availability as CaO - 87.4%
```

The results of the scrubbing operation using this lime are listed in Table II:

Table II

| $SO_2$ (ppm) In Gaseous Stream | | % $SO_2$ Removed | Stoichiometry Used [CaO to $SO_2$] |
|---|---|---|---|
| Inlet | Outlet | | |
| 2759 | 843 | 69.8 | 1.17 |
| 2948 | 840 | 71.5 | 1.08 |
| 2817 | 906 | 67.8 | 1.05 |
| 2809 | 851 | 69.7 | 0.99 |
| 2919 | 962 | 67.0 | 1.04 |

With the use of the high calcium limes of Examples I and II, the stoichiometry could not be increased to a high value without resulting in free lime being pumped into the scrubber which presents a problem of calcium carbonate scale formation in the system.

EXAMPLE III

A further operation of the scrubber, as in Example I, was carried out except that a mixture of the lime of Example II and semi-hydrated dolomitic lime (20% by weight) used. The mixture had the following analysis:

```
           CaO - 84.5%
           MgO - 6.5%
 Loss in Ignition - 8.5%
           SiO_2 - 0.8%
          R_2O_3 - 0.4%
Availability as CaO - 85.5%
```

The results of scrubbing tests using this mixture are listed in Table III:

Table III

| $SO_2$ (ppm) In Gaseous Stream | | % $SO_2$ Removed | Stoichiometry Used [CaO + MgO to $SO_2$] |
|---|---|---|---|
| Inlet | Outlet | | |
| 2808 | 390 | 86.1 | not recorded |
| 2963 | 291 | 90.8 | 115 |
| 3037 | 352 | 88.4 | 116 |
| 3023 | 370 | 87.8 | 113 |
| 3008 | 592 | 80.3 | 102 |
| 2942 | 281 | 90.4 | 107 |
| 3000 | 471 | 84.3 | 99 |
| 2905 | 154 | 94.7 | 124 |

As is seen, under conditions used in Examples I and II, the use of the present process wherein the magnesium content of the scrubbing liquor is increased, the $SO_2$ removal was effected in percentages of 80-90% as compared with percentages in the 60's and 70's previously listed.

EXAMPLE IV

A further experiment, using the scrubbing system of the previous example, was made using a mixture of the high calcium lime of Example II and burnt dolomite (12.5% by weight). The mixture had the following analysis:

CaO − 90.4%
MgO − 5.4%
Loss on Ignition − 4.0%
$SiO_2$ − 0.5%
$R_2O_3$ − 0.4%
Availability as CaO − 86.6%

The results of scrubbing tests using this mixture are listed in Table IV.

Table IV

| Inlet | Outlet | % $SO_2$ Removed | Stoichiometry Used [CaO + MgO to $SO_2$] |
|---|---|---|---|
| 3077 | 253 | 91.8 | 128 |
| 2713 | 157 | 94.2 | 122 |
| 2853 | 118 | 95.9 | 121 |
| 2824 | 112 | 96.0 | 123 |
| 2897 | 135 | 95.3 | 115 |
| 3000 | 322 | 89.8 | 108 |
| 3033 | 125 | 96.0 | 110 |

As is seen from the results, exceptionally high $SO_2$ removal was achieved.

EXAMPLE V

During the operation of the scrubber in Examples II–IV, the alkalinity of the liquor fed to the scrubber was determined by water analysis. Four aliquots were taken during Example II operation, Aliquots A and B taken at the inlet to the Stage I scrubber and Aliquots C and D taken at the inlet to the Stage II scrubber. Aliquots E and F were taken from the scrubber feed during operation of the scrubber in Example III. Two days later, when the magnesium containing water was recycled in Example III operation, aliquots G and H were taken. Aliquots I, J, K, and L were taken in Example IV wherein the high magnesium content liquor in the system was retained and only the lime changed. The analysis of the various aliquots, to determine alkalinity (expressed in ppm as $CaCO_3$) were made and are listed in Table V.

Table V

| Aliquot | pH | Ca++ | Mg++ | Alkalinity (ppm) |
|---|---|---|---|---|
| A | 9.37 | 244 | 77 | 163 |
| B | 9.29 | 126 | 73 | 96 |
| C | 8.32 | 244 | 91 | 76 |
| D | 7.33 | 131 | 85 | 76 |
| E | 7.78 | 34 | 555 | 425 |
| F | 7.08 | 134 | 584 | 334 |
| G | 9.50 | 67 | 1257 | 1606 |
| H | 9.12 | 48 | 1308 | 1458 |
| I | 6.94 | 57 | 1507 | 853 |
| J | 7.17 | 51 | 1535 | 1068 |
| K | 7.73 | 56 | 1766 | 1482 |
| L | 8.73 | 51 | 1539 | 1614 |

As seen from Table V, the alkalinity of the liquor increased markedly with addition of magnesium to the system, this alkalinity increasing correspondingly the sulfur dioxide removal from the gaseous stream as illustrated in the previous Examples. At the same time the calcium ion concentration decreased, which reduces the amount of scaling throughout the system.

I claim:

1. In a lime scrubbing process for removal of oxides of sulfur from a gaseous stream, wherein said gaseous stream is contacted in a scrubbing unit with an aqueous liquor containing calcium salts and wherein aqueous effluent from the scrubbing unit is clarified, with removal of a solids slurry containing predominantly solid calcium salts as reaction product, as clarifier underflow, and wherein aqueous liquor is recycled to the scrubbing unit; the improvement comprising preventing the formation of scaling within the scrubbing unit by adding to said calcium salt-containing liquor sufficient magnesium oxide to provide a magnesium ion content of 250–5000 parts per million by weight in said aqueous liquor within said scrubbing unit, so as to prevent saturation of the liquor with magnesium salts and significant resultant precipitation and loss of magnesium in the clarifier underflow, with the pH of said aqueous liquor being between 5.5 and 10.0 upon introduction of the scrubbing unit, to increase the alkalinity of the liquor and the removal of oxides of sulfur from the gaseous stream.

2. In the process defined in claim 1, the improvement wherein said magnesium oxide is added to said calcium salt containing liquor in the form of a burnt lime composition containing calcium oxide and between 1.5 to 7 per cent by weight of magnesium oxide.

3. In the process defined in claim 2, the improvement wherein said burnt lime composition is formed by calcining limestone containing magnesium and calcium in a ratio of between 1:60 to 1:9.

4. In the process defined in claim 2, the improvement wherein said burnt lime composition is formed by blending a high calcium content limestone and a high magnesium content limestone and calcining said blend.

5. In the process defined in claim 1, the improvement wherein said aqueous effluent from said scrubbing unit, that is recycled thereto, contains the magnesium salts, magnesium carbonate, magnesium bicarbonate and magnesium sulfite in addition to magnesium hydroxide and calcium salts, which magnesium salts react with sulfur dioxide within said scrubbing unit.

6. In the process defined in claim 5, the improvement wherein said magnesium salts are replenished by containing said effluent for a period of time and adding thereto, during said period, an aqueous mixture of calcium oxide and magnesium oxide.

7. In the process defined in claim 1, the improvement wherein aqueous effluent from the scrubbing unit is passed to a clarifying unit and held therein and wherein, following holding of said effluent in said clarifying unit, clarified effluent is returned to the scrubbing unit.

8. In the process defined in claim 7, the improvement wherein a calcium compound selected from calcium oxide and calcium hydroxide is added to clarifying unit underflow to increase precipitation of solids from the underflow.

9. In the process defined in claim 1, the improvement wherein aqueous effluent from the scrubbing unit is contained for a period of time and following said containment is passed to a clarifying unit and held therein to separate solids therefrom and wherein, following holding of said effluent in said clarifying unit, at least a portion of clarified effluent is added to said scrubber effluent so contained.

10. In the process defined in claim 9, the improvement wherein there is also added to said scrubber effluent so contained, a mixture of calcium and magnesium compounds selected from calcium oxide and hydroxide and magnesium oxide and hydroxide.

11. In a lime scrubbing process for removal of oxides of sulfur from a gaseous stream resulting from the combustion of a sulfur-containg fuel, wherein said gaseous stream is contacted in a scrubbing unit with an aqueous liquor containing calcium salts and wherein aqueous effluent from the scrubbing unit is clarified, with removal of a solids slurry containing predominantly solid calcium salts as reaction product, as clarifier underflow and wherein aqueous liquor is recycled to the scrubbing unit; the improvement comprising preventing the formation of scaling within the scrubbing unit by adding to said aqueous effluent, prior to recycle to the scrubbing unit, calcium oxide and magnesium oxide, the magnesium oxide being added in an amount sufficient to provide a magnesium ion content of 250–5000 parts per million by weight in said aqueous liquor within said scrubbing unit, so as to prevent saturation of the liquor with magnesium salts and significant resultant precipitation and loss of magnesium in the clarifier underflow, with the pH of said aqueous liquor being between 5.5 and 10.0 upon introduction to the scrubbing unit, to increase the alkalinity of the liquor and the removal of oxides of sulfur from the gaseous stream.

* * * * *